United States Patent
Jeon et al.

(10) Patent No.: US 8,482,630 B2
(45) Date of Patent: Jul. 9, 2013

(54) APPARATUS AND METHOD FOR ADJUSTING AUTOMATIC WHITE BALANCE BY DETECTING EFFECTIVE AREA

(75) Inventors: Young Sun Jeon, Yongin-si (KR); Ho Jin Lee, Seoul (KR); Young Su Moon, Seoul (KR); Shi Hwa Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 415 days.

(21) Appl. No.: 12/858,176

(22) Filed: Aug. 17, 2010

(65) Prior Publication Data

US 2011/0050948 A1   Mar. 3, 2011

(30) Foreign Application Priority Data

Aug. 27, 2009  (KR) .................. 10-2009-0079890

(51) Int. Cl.
*H04N 9/73*   (2006.01)
(52) U.S. Cl.
USPC .................................... 348/223.1; 348/225.1
(58) Field of Classification Search
USPC ............... 348/223.1, 224.1, 225.1; 382/162, 382/167, 169, 273–275
See application file for complete search history.

(56) References Cited

U.S. PATENT DOCUMENTS

| | | | |
|---|---|---|---|
| 5,282,022 A | 1/1994 | Haruki et al. | |
| 6,487,309 B1 * | 11/2002 | Chen | 382/162 |
| 6,727,942 B1 * | 4/2004 | Miyano | 348/223.1 |
| 2005/0270383 A1 | 12/2005 | Hung | |
| 2006/0164521 A1 | 7/2006 | Chikane et al. | |
| 2007/0041064 A1 | 2/2007 | Subbotin | |
| 2008/0049274 A1 * | 2/2008 | Subbotin | 358/516 |
| 2008/0101690 A1 * | 5/2008 | Hsu et al. | 382/162 |

FOREIGN PATENT DOCUMENTS

| | | |
|---|---|---|
| JP | 2000-165896 | 6/2000 |
| JP | 2002-185977 | 6/2002 |
| JP | 2005-79623 | 3/2005 |
| JP | 2007-142535 | 6/2007 |
| KR | 10-2006-0092658 | 8/2006 |
| KR | 10-2008-0029226 | 4/2008 |
| KR | 10-2008-0077742 | 8/2008 |
| KR | 10-2008-0080224 | 9/2008 |
| KR | 10-2008-0086491 | 9/2008 |
| KR | 10-2009-0074090 | 7/2009 |

* cited by examiner

*Primary Examiner* — Lin Ye
*Assistant Examiner* — Euel Cowan
(74) *Attorney, Agent, or Firm* — Staas & Halsey LLP

(57) ABSTRACT

An automatic white balance adjusting apparatus and method based on detection of an effective area. The automatic white balance adjusting apparatus may detect the effective area by using a color temperature, a luminance, and a correlation, and may adjust a white balance with respect to the detected effective area.

11 Claims, 10 Drawing Sheets

APPARATUS AND METHOD FOR ADJUSTING AUTOMATIC WHITE BALANCE BY DETECTING EFFECTIVE AREA

CROSS-REFERENCE TO RELATED APPLICATIONS

This application claims the benefit of Korean Patent Application No. 10-2009-0079890, filed on Aug. 27, 2009, in the Korean Intellectual Property Office, the disclosure of which is incorporated herein by reference.

BACKGROUND

1. Field

Example embodiments relates to an automatic white balance adjusting apparatus and method, and more particularly, to an apparatus and method that detects an effective area and adjusts an automatic white balance.

2. Description of the Related Art

Generally, although images of the same object are taken by an imaging device, such as a digital camera, a digital video camera, and the like, colors of the taken images appear different depending on a condition of a light source, such as an indoor white lamp, a fluorescent lamp, sunlight, and the like. The imaging device reproduces white including blue shades when a color temperature is high and reproduces white including red shades when a color temperature is low, since RGB components included in the light source that has different color temperatures are reflected. Here, white area may be an area that has the highest luminance in the grey area.

Accordingly, when the color temperature is changed by the light source, the imaging device needs to adjust a white balance to control the changed white area to appear white.

SUMMARY

According to an aspect of one or more example embodiments, there may be provided an apparatus of adjusting an automatic white balance, the apparatus including a candidate area extracting unit to extract, from an input image, a candidate area having color information by eliminating an area that does not include color information, an effective area extracting unit to determine a grey area from the candidate area, and to extract an effective area from the grey area based on a correlation between a color temperature and the grey area, and a white balance adjusting unit to determine a white balance parameter from the effective area and to adjust a white balance with respect to the input image.

The candidate area extracting unit includes an area classifying unit to classify the input image into a plurality of areas, a data sampling unit to perform sampling of pixel data with respect to each classified area, an area eliminating unit to eliminate the area that does not include the color information by using the sampled pixel data, and a data operation unit to perform an operation to obtain an average value of the sampled pixel data with respect to the candidate area.

The effective area extracting unit includes a grey area determining unit to determine the grey area based on a relationship between Cr and Cb with respect to the candidate area and a relationship between R and B with respect to the candidate area, a grey area classifying unit to classify the grey area by using color temperature information, luminance information, and the correlation with respect to the grey area, and an effective area selecting unit to select the effective area based on a correlation between a grey area model and an area classified as an area having luminance information of a higher value than a reference value within the grey areas.

The grey area determining unit includes a color coordinate transforming unit to transform a color coordinate with respect to the candidate area, a candidate grey area determining unit to determine a candidate grey area based on the relationship between Cb and Cr with respect to the candidate area having the transformed color coordinate; and a grey area filtering unit to perform filtering of the grey area by using a ratio of R and B with respect to the candidate grey area.

The grey area classifying unit comprises a magnitude determining unit to determine a magnitude of the luminance information and a magnitude of the color temperature information with respect to the grey area, an area classifying unit to classify the grey area according to the magnitude of the luminance information and the magnitude of the color temperature information, a counting unit to count R, G, and B values with respect to the classified grey area, and to count a number of the classified grey areas, and a correlation operation unit to perform an operation to obtain the correlation between the color temperature and the grey area. Also, the effective area selecting unit selects a grey area of which a correlation between the color temperature and the classified grey area is more than the reference value, and the white balance adjusting unit adjusts the white balance of the input image by using the white balance parameter which is based on the R, G, and B values with respect to the grey area selected as the effective area, and the number of counted grey areas.

According to another aspect of one or more example embodiments, there may be provided a method of adjusting an automatic white balance, the method including extracting, from an input image, a candidate area having color information by eliminating an area that does not include color information, determining a grey area from the candidate area, and extracting an effective area from the grey area based on a correlation between a color temperature and the grey area, and determining a white balance parameter from the effective area and adjusting a white balance with respect to the input image.

The extracting of the candidate area may include classifying the input image into a plurality of areas, sampling pixel data with respect to each classified area, eliminating the area that does not include the color information by using the sampled pixel data, and performing an operation to obtain an average value of the sampled pixel data with respect to the candidate area.

The extracting of the effective area may include determining the grey area based on a relationship between Cr and Cb with respect to the candidate area, and a relationship between R and B with respect to the candidate area, classifying the grey area by using color temperature information, luminance information, and the correlation with respect to the grey area, and selecting the effective area based on a correlation between a grey area model and an area classified as an area having luminance information of a higher value than a reference value within the grey areas.

The determining of the grey area may include transforming a color coordinate with respect to the candidate area, determining a candidate grey area based on the relationship between Cb and Cr with respect to the candidate area having the transformed color coordinate, and filtering the grey area by using a ratio of R and B with respect to the candidate grey area.

The classifying of the grey area may include determining a magnitude of the luminance information and a magnitude of the color information with respect to the grey area, classifying the grey area according to the magnitude of the luminance information and the magnitude of the color temperature information, counting R, G, and B values with respect to the classified grey area, and counting a number of the classified grey areas, and performing an operation to obtain the correlation between the classified grey areas and the grey area model. Also, the selecting of the effective area may select a grey area of which a correlation between the color temperature and the classified grey area is more than the reference value, as the effective area, and the adjusting of the white balance may adjust the white balance of the input image by using the white balance parameter which is based on the R, G, and B values with respect to the grey area selected as the effective area, and the number of counted grey areas.

Additional aspects and/or advantages will be set forth in part in the description which follows and, in part, will be apparent from the description, or may be learned by practice of the embodiments.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
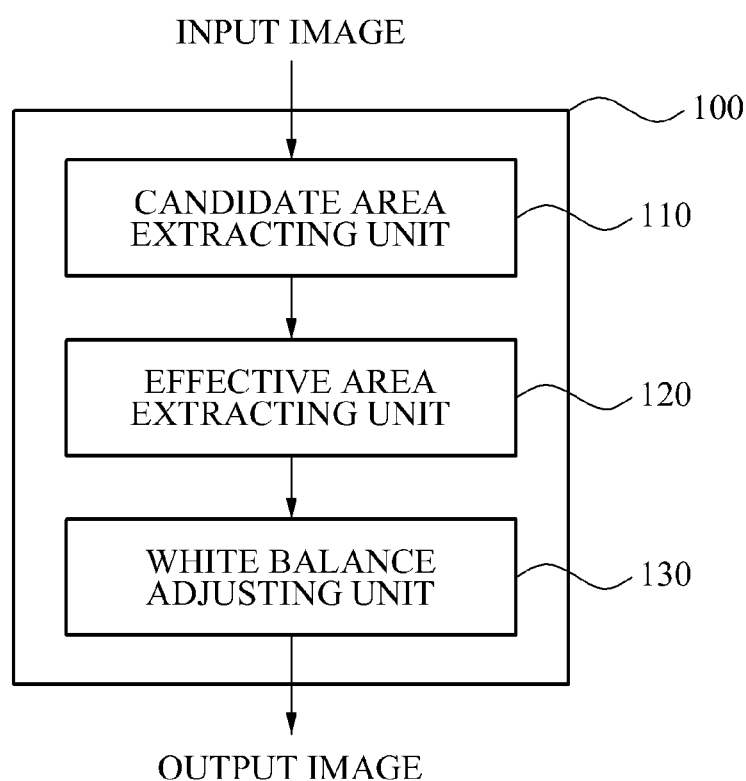
FIG. 1 is a block diagram illustrating an entire configuration of an automatic white balance adjusting apparatus according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

FIG. 1 is a block diagram illustrating an entire configuration of an automatic white balance adjusting apparatus 100 according to example embodiments.

Referring to FIG. 1, the automatic white balance adjusting apparatus 100 according to an example embodiment includes a candidate area extracting unit 110, an effective area extracting unit 120, and a white balance adjusting unit 130. That is, the automatic white balance adjusting apparatus 100 extracts, by the candidate extracting unit 110, a candidate area where a white balance is adjustable with respect to an input image, extracts, by the effective area extracting unit 120, an effective area from the extracted candidate area, and adjusts, by the white balance adjusting unit 130, a white balance with respect to the effective area. The white balance is adjusting, to an actual grey color, a grey area of the input image that is discolored by the light source. In this instance, although the grey area may be replaced with a white area of the input image, the white balance may be performed with respect to the grey area according to an example embodiment.

The candidate area extracting unit 110 eliminates an area that does not include color information from the input image, and extracts a candidate area having color information. The candidate area is the area having color information by eliminating a bright area that does not include color information from the input image. That is, the candidate area extracting unit regards an area where at least one of R, G, and B values is saturated, such as a highlight area in the input image, as the area that does not include the color information, eliminates the area that does not include color information, and extracts an area that includes color information as the candidate area.

As an example, when a pixel of the input image is represented based on R, G, and B values in a range of 0 to 255 and one of the R, G, and B values is "255", the candidate area extracting unit 110 determines an area having the value of 255 as a bright area that does not include the color information, eliminates the area, and extracts an area having effective color information as the candidate area. The candidate area extracting 110 will be described in detail with reference to FIG. 2.

Figure 2:
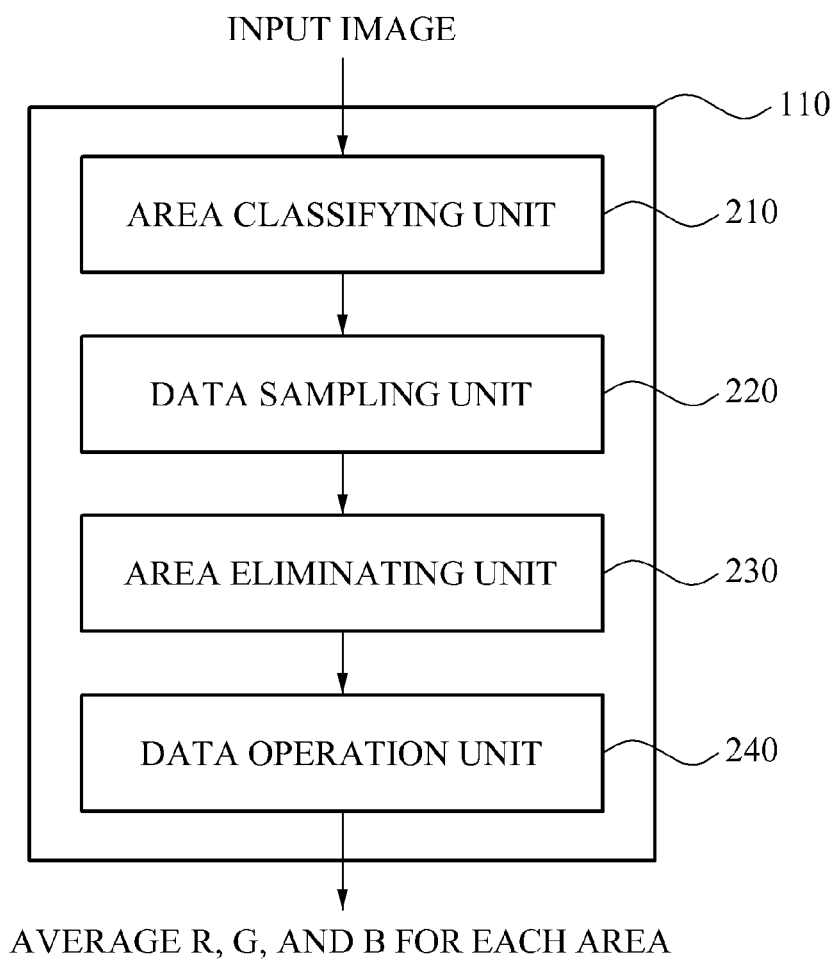
FIG. 2 is a block diagram illustrating a detailed configuration of a candidate area extracting unit, for example the candidate area extracting unit of FIG. 1.

FIG. 2 is a block diagram illustrating a detailed configuration of a candidate area extracting unit, for example the candidate area extracting unit 110 of FIG. 1.

Referring to FIG. 2, the candidate area extracting unit 110 includes an area classifying unit 210, a data sampling unit 220, an area eliminating unit 230, and a data operation unit 240.

The area classifying unit 210 classifies the input image into a plurality of areas.

Figure 3:
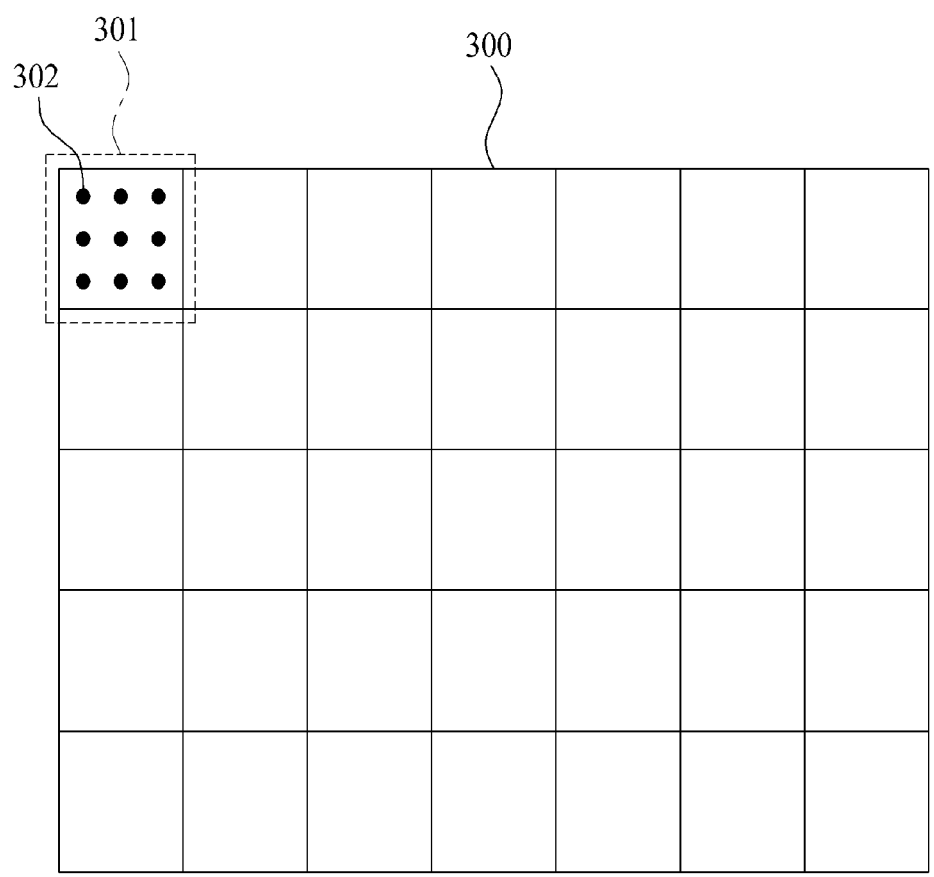
FIG. 3 illustrates an example of sampling pixel data from a plurality of areas of an input image according to example embodiments.

FIG. 3 illustrates an example of sampling pixel data from a plurality of areas of an input image according to example embodiments.

Referring to FIGS. 2 and 3, the area classifying unit 210 may classify the input image 300 into W*H areas. A first area 301 indicates a single area of the classified plurality of areas, and first pixel data 302 indicates pixel data to be sampled among pixel data included in the first area 301.

The data sampling unit 220 performs sampling of pixel data with respect to each classified area. As an example, the data sampling unit 220 may perform sampling of at least one pixel data with respect to each of the plurality of areas. A number of the sampled pixel data and a location of the sampled pixel data are not limited. As an example, the data sampling unit 220 may perform sampling of all pixel data included in the plurality of areas or may perform sampling of pixel data placed in a center of each area among pixel data included in the plurality of areas.

The area eliminating unit 230 eliminates an area that does not include color information by using the sampled pixel data. That is, the area eliminating unit 230 regards an area where at least one of R, G, and B values of the sampled pixel data is saturated as a bright area that does not include the color information, and eliminates the saturated area. As an example, when one of the R, G, and B values of the sampled pixel data is greater than a reference value, the area eliminating unit 230 determines as a bright area, an area that does not include the color information, eliminates the corresponding area, and extracts an area having effective color information as the candidate area.

The data operation unit 240 performs an operation to obtain an average value of the sampled data of the candidate area. As an example, the data operation unit 240 may perform an operation to obtain the average value of the R, G, and B values of the sampled data for each candidate area having the color information.

The effective area extracting unit 120 (FIG. 1) determines a grey area from the candidate area, and extracts an effective area from the grey area based on a correlation between a color temperature and the grey area.

Figure 4:
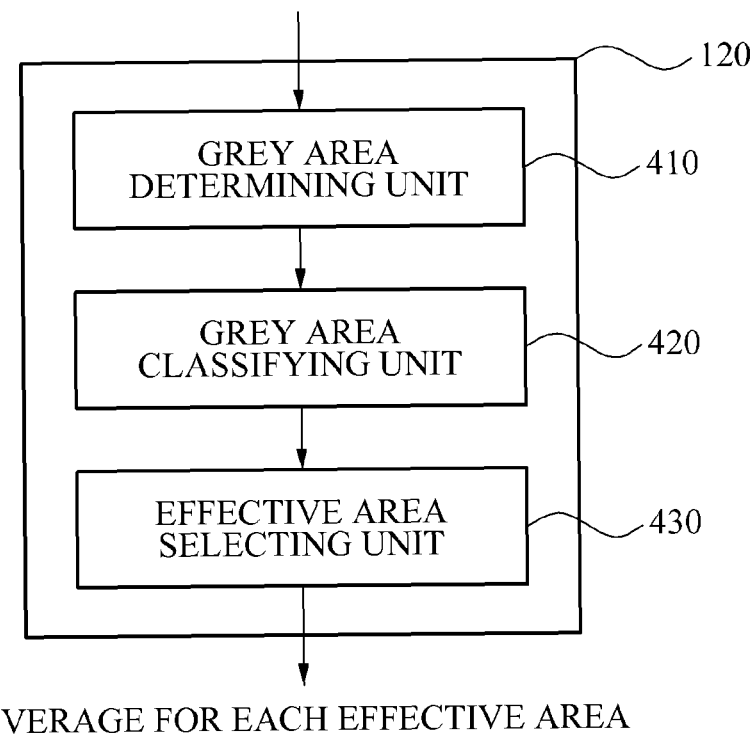
FIG. 4 is a block diagram illustrating a detailed configuration of an effective area extracting unit, for example the effective area extracting unit of FIG. 1.

FIG. 4 is a block diagram illustrating a detailed configuration of an effective area extracting unit, for example, the effective area extracting unit 120 of FIG. 1.

Referring to FIG. 4, the effective area extracting unit 120 includes a grey area determining unit 410, a grey area classifying unit 420, and an effective area selecting unit 430.

The grey area determining unit 410 determines a grey area based on a relationship between Cb and Cr with respect to a candidate area and based on a relationship between R and B with respect to the candidate area. The grey area determining unit 410 transforms a color coordinate with respect to the candidate area, determines whether the grey area is included within the candidate area based on the relationship between the Cb and Cr with respect to the candidate area, and performs filtering of the grey area by using a ratio of R and B with respect to the candidate area. Hereinafter, the grey area determining unit 410 will be described in detail with reference to FIG. 5.

Figure 5:
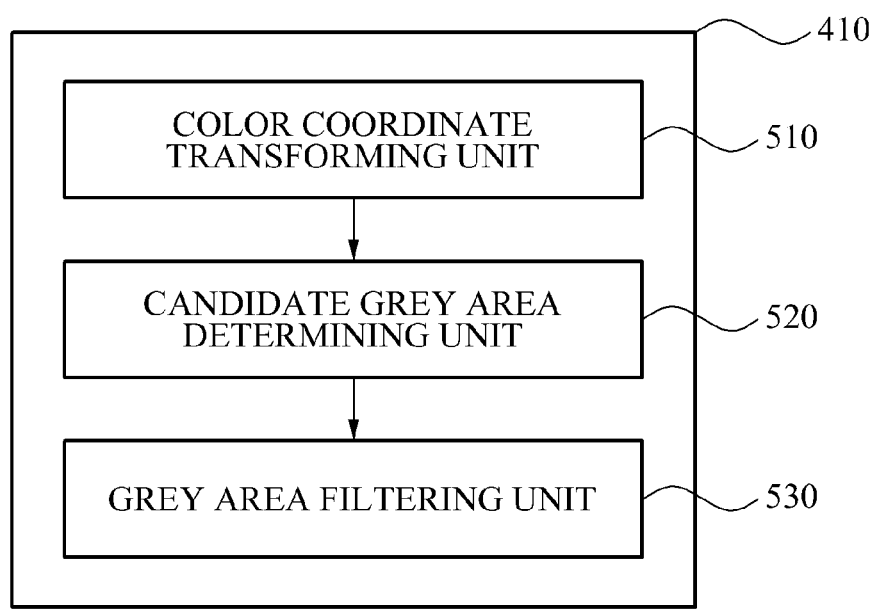
FIG. 5 is a block diagram illustrating a detailed configuration of a grey area determining unit, for example the grey area determining unit of FIG. 4.

FIG. 5 is a block diagram illustrating a detailed configuration of a grey area determining unit, for example the grey area determining unit 410 of FIG. 4.

Referring to FIG. 5, the grey area determining unit 410 includes a color coordinate transforming unit 510, a candidate grey area determining unit 520, and a grey area filtering unit 530.

The color coordinate transforming unit 510 transforms a color coordinate with respect to the candidate area. As an example, the color coordinate transforming unit 510 may transform a color coordinate with respect to the candidate area into a YCbCr color coordinate. Here, Y indicates a luminance data, and Cb and Cr indicate color difference data.

The candidate grey area determining unit 520 determines a candidate grey area based on a relationship between Cb and Cr with respect to the candidate area having the transformed color coordinate. That is, the candidate grey area determining unit 520 determines the candidate grey area by using the relationship between the Cb and Cr with respect to the candidate area from which the color coordinate is transformed into the YCbCr color coordinate.

The grey area filtering unit 530 performs filtering of a grey area by using a ratio of R and B with respect to the candidate grey area. That is, the grey area filtering unit 530 performs filtering to extract an area that also has a feature of the grey area with respect to the ratio of R and B among candidate grey areas having a feature of the grey area based on the relationship between the Cb and Cr.

The grey area classifying unit 420 (FIG. 4) classifies the grey area by using color temperature information, luminance information, and correlation with respect to the grey area. That is, the grey area classifying unit 420 (FIG. 4) may classify areas that are determined as grey areas, by using the color temperature information, the luminance information, and the correlation with respect to the grey area filtered based on the relationship between Cb and Cr, and the ratio of R and B. Hereinafter, a detailed configuration and operation of the grey area classifying unit 420 (FIG. 4) will be described in detail with reference to FIG. 6.

Figure 6:
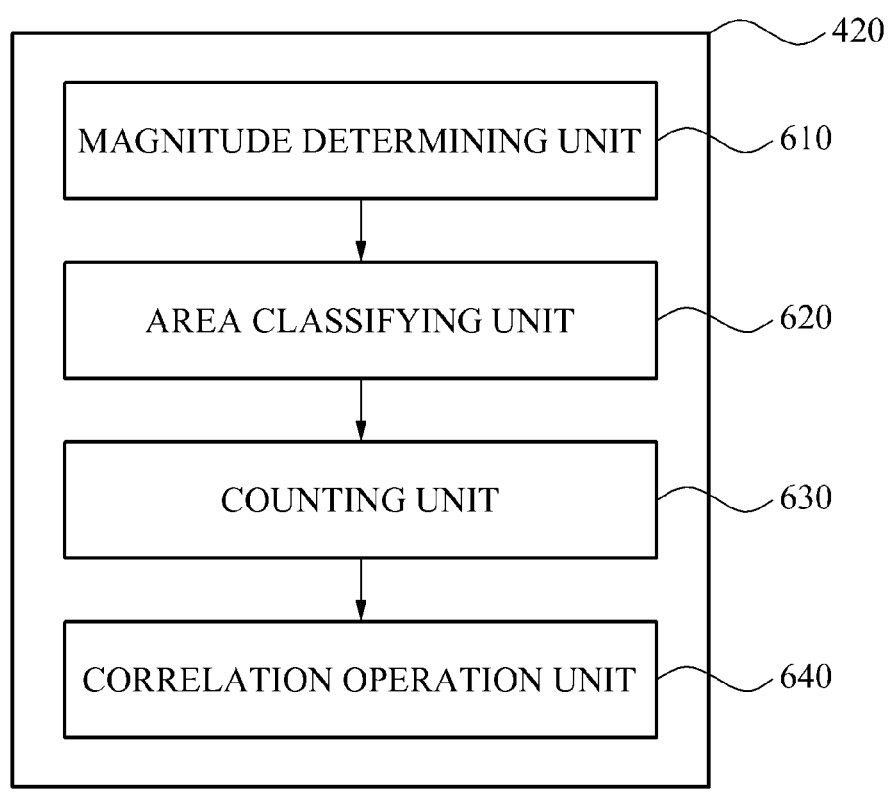
FIG. 6 is a block diagram illustrating a detailed configuration of a grey area classifying unit, for example the grey area classifying unit of FIG. 4.

FIG. 6 is a block diagram illustrating a detailed configuration of a grey area classifying unit, for example the grey area classifying unit 420 of FIG. 4.

Referring to FIG. 6, the grey area classifying unit 420 includes a magnitude determining unit 610, an area classifying unit 620, a counting unit 630, and a correlation operation unit 640.

The grey area classifying unit 420 counts a number of areas satisfying a condition for each color temperature, from a range having a highest luminance value. Further, the grey area classifying unit 420 selects the counted number of areas for each color temperature being greater than a reference value and areas having the highest luminance value, as a candidate grey area. Then, the grey area classifying unit 420 performs an operation with respect to the candidate grey area to obtain a correlation between the color temperature and the selected area, and classifies a candidate grey area having a highest correlation as a final candidate grey area.

The magnitude determining unit 610 determines a magnitude of luminance information and the color temperature information with respect to the grey area.

The area classifying unit 620 classifies the grey area according to the magnitude of the luminance information and the color temperature information.

Figure 7:
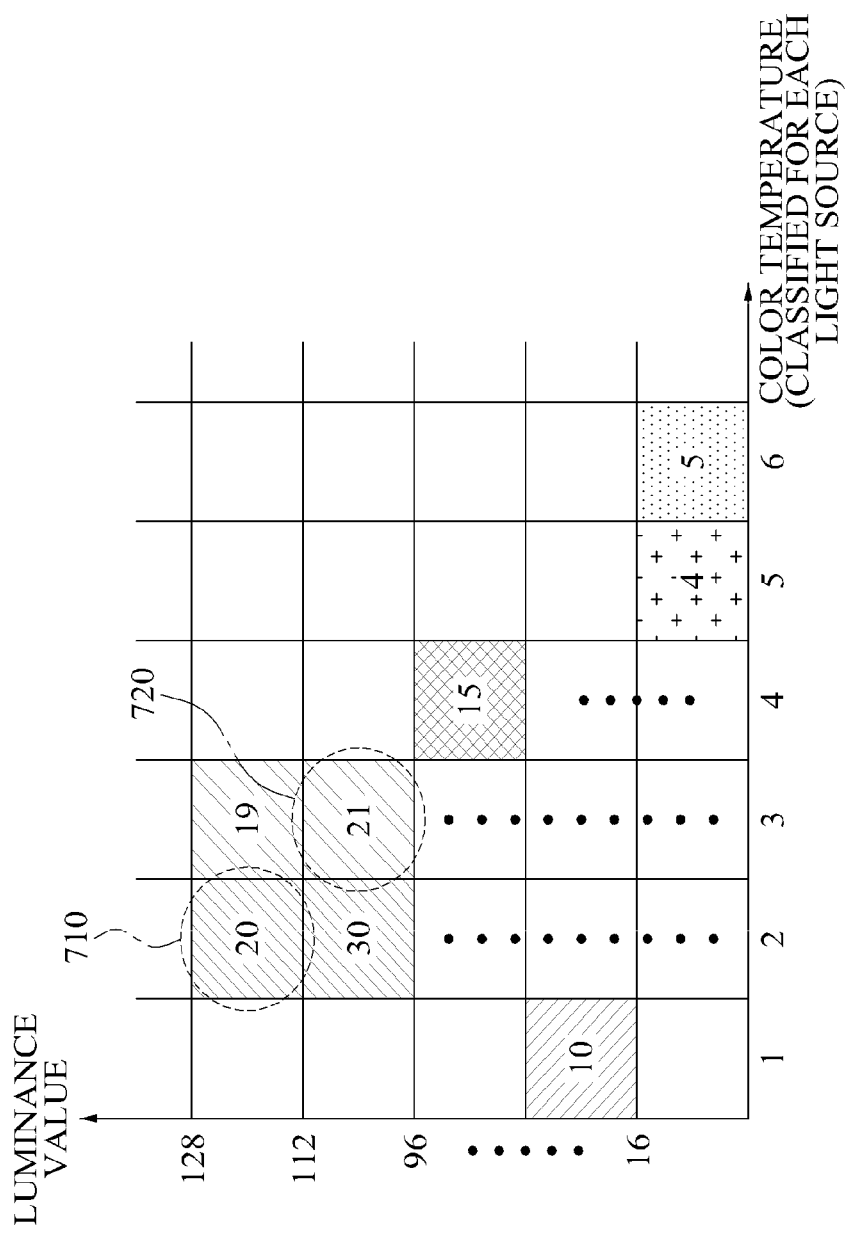
FIG. 7 illustrates an operation of classifying a grey area by using color temperature information and luminance information according to example embodiments.

FIG. 7 illustrates an operation of classifying a grey area by using color temperature information and luminance information according to example embodiments Referring to FIGS. 6 and 7, the area classifying unit 620 classifies areas based on the magnitude of the luminance information and the color temperature information. A first section 710 indicates a luminance value being greater than or equal to 112 and less than 128, and indicates 20 areas of which a color temperature is classified as No. 2. A second section 720, which indicates an accumulated number of areas, indicates a luminance value being greater than or equal to 96 and less than 112, and indicates a sum, "21", which is a sum of a number of areas classified as a color temperature No. 3 including a number of counted areas in a previous operation, the previous operation shown by the number "19".

The counting unit 630 counts R, G, and B values with respect to each of the classified areas, and counts a number of areas with respect to the classified grey area. That is, the counting unit 630 counts the number of areas satisfying a condition for each color from a range having a highest luminance information. As an example, the counting unit 630 that counts the number of first section 710 having a luminance value being greater than or equal to 112 and less than 128 and having a color temperature classified as No. 2, obtains "20" as the number of the first section 710, and stores "20". As another example, the counting unit 630 may count "21" by adding the number of the second section 720 having a luminance value being greater than or equal to 96 and less than 112 and having a color temperature classified as No. 3, with the number of areas that is counted in a previous operation, "19".

The grey area classifying unit 420 detects areas having a highest luminance value and for each color temperature the number of areas whose luminance value is greater than the reference value, as candidate grey areas. As an example, when the reference value is "20", the grey area classifying unit 420 may detect the first section 710 and the second section 720 that have the highest luminance value and the number of areas counted for the respective color temperatures associated with the first section 710 and the second section 720 are greater than the reference value as illustrated in FIG. 7.

The grey area classifying unit 420 selects an area having a highest luminance value of the detected candidate grey areas as a first candidate grey area. As an example, the grey area classifying unit 420 may select the first section 710 having the highest luminance value in a range of 112 to 128 among the detected candidate grey areas, namely the first section 710 and the second section 720, as the first candidate grey area.

When a detected color temperature has an area in which a luminance range is within a reference range and is similar to a luminance range of the first candidate grey area as a maximum luminance area, the grey area classifying unit 420 selects the area as a second candidate grey area.

The correlation operation unit 640 performs an operation to obtain a correlation between the color temperature and the grey area. That is, the correlation operation unit 640 performs an operation to obtain the correlation between a color temperature of a light source and the grey area with respect to the first candidate grey area and the second candidate grey area.

The grey area classifying unit 420 classifies an area having a highest correlation as a final candidate grey area after performing, through the correlation operation unit 640, the operation to obtain the correlation between the color temperature and the grey area with respect to the first candidate grey area and the second candidate grey area.

The effective area selecting unit 430 (FIG. 4) selects an effective area based on a correlation between a grey area model and an area classified as an area having more luminance information than a reference value among the grey area. That is, the effective area selecting unit 430 may select a grey area where a correlation between the classified grey area and the grey area model is more than the reference value, as the effective area.

Figure 8:
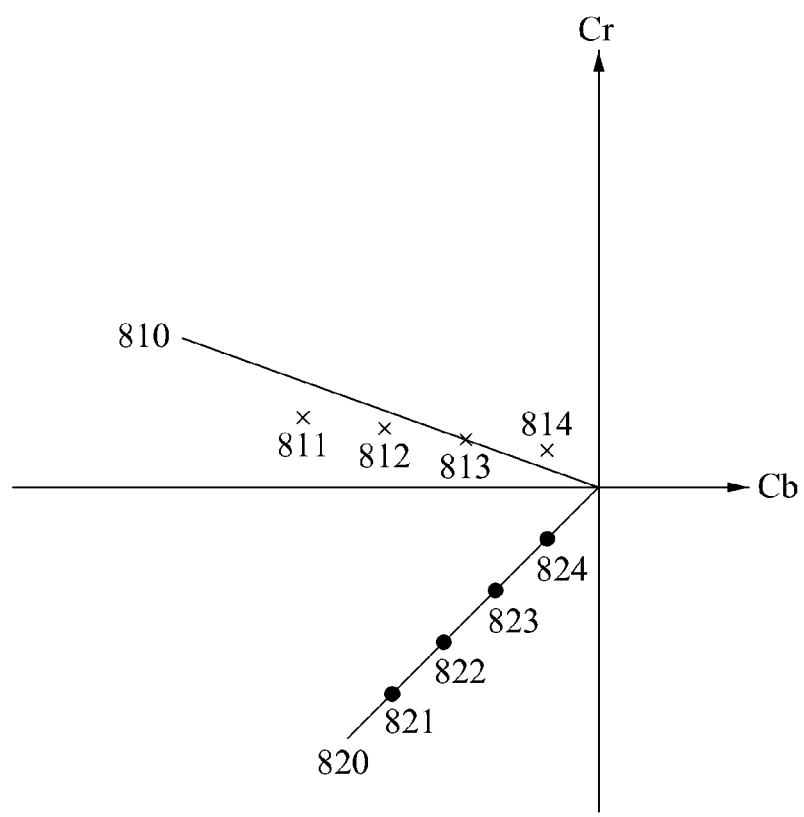
FIG. 8 illustrates a correlation for selecting an effective area according to example embodiments.

FIG. 8 illustrates a correlation for selecting an effective area according to example embodiments.

Referring to FIG. 8, first and second grey area models 810 and 820 illustrate respective reference values as a function of Cr and Cb. When a correlation between a first grey area model 810 and pixel data 811, 812, 813, and 814 with respect to a first grey area is less than a reference value, the effective area selecting unit 430 (FIG. 4) does not select the first grey area as an effective area. When a correlation between a second grey area model 820 and pixel data 821, 822, 823, and 824 with respect to a second grey area is greater than the reference value, the effective area selecting unit 430 (FIG. 4) may select the second grey area as the effective area.

The white balance adjusting unit 130 (FIG. 1) determines a white balance parameter from the effective area and adjusts a white balance with respect to an input image. That is, the white balance adjusting unit 130 adjusts the white balance with respect to the input image by using R, G, and B values with respect to the grey area and a number of counted pixel data of the grey area as the white balance parameter. Hereinafter, a configuration and an operation of the white balance adjusting unit 130 (FIG. 1) will be described in detail with reference to FIG. 9.

Figure 9:
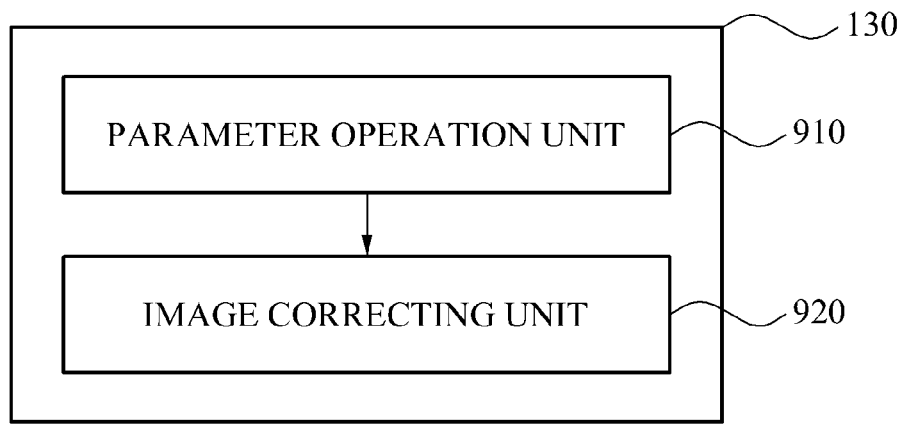
FIG. 9 is a block diagram illustrating a detailed configuration of a white balance adjusting unit, for example the white balance adjusting unit of FIG. 1.

FIG. 9 is a block diagram illustrating a detailed configuration of a white balance adjusting unit, for example the white balance adjusting unit 130 of FIG. 1.

Referring to FIG. 9, the white balance adjusting unit 130 includes a parameter operation unit 910 and image correcting unit 920.

The parameter operation unit 910 performs an operation to obtain a white balance parameter by using data with respect to a grey area selected as an effective area. That is, the parameter operation unit 910 may perform the operation to obtain the white balance parameter by using image information from the grey area selected as the effective area, as opposed to obtaining a white balance parameter with respect to the entire image.

As an example, the parameter operation unit 910 may perform an operation to obtain an average value of R, G, and B as data with respect to the grey area selected as the effective area, and may perform an operation to obtain a first white balance parameter (Kr) based on a ratio between an average R ($R_{avg}$) and an average G ($G_{avg}$) and a second white balance parameter (Kb) based on a ratio between an average B ($B_{avg}$) and $G_{avg}$. In this instance, the first white balance parameter may be defined as $Kr=G_{avg}/R_{avg}$, and the second white balance parameter may be defined as $Kb=G_{avg}/B_{avg}$. As an example, when $R_{avg}$ is "100", $G_{avg}$ is "120", and $B_{avg}$ is "100", the parameter operation unit 910 may calculate Kr as "120/100=1.2", and may calculate Kb as "120/100=1.2".

The image correcting unit 920 may correct an input image by applying the first white balance parameter and the second white balance parameter on the entire input image. In this instance, the image correcting unit 920 may correct the input image by applying the first white balance parameter and the second white balance parameter to the entire image, as opposed to the parameter operation unit 910. The first white balance parameter and the second white balance parameter may be applied to a color channel of each pixel data constituting the input image. In this instance, the first balance parameter may be applicable to a red channel of pixel data, and the second white balance parameter is applicable to a blue channel of pixel data.

As described above, the white balance adjusting unit 130 may change a red value and a blue value of pixel data of the entire image by correcting the input image, and thereby adjusting the white balance of the entire image.

Figure 10:
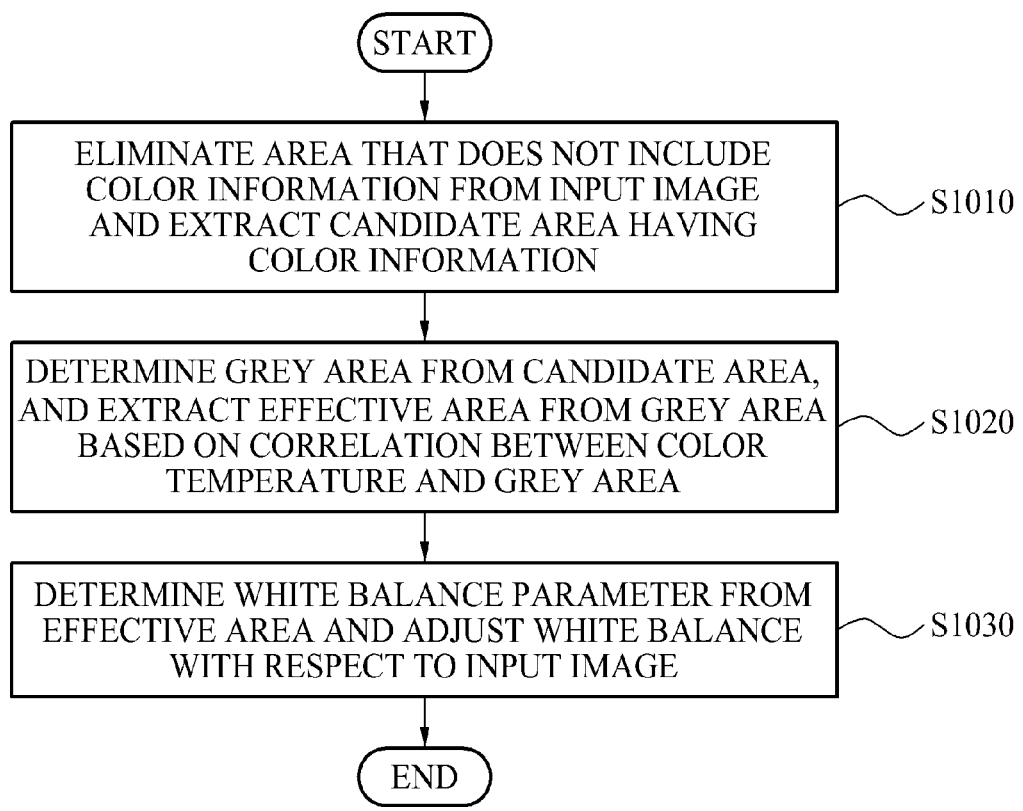
FIG. 10 is a flowchart illustrating a total process of an automatic white balance adjusting method according to example embodiments.

FIG. 10 is a flowchart illustrating a total process of an automatic white balance adjusting method according to example embodiments.

Referring to FIG. 10, the automatic white balance adjusting apparatus eliminates an area that does not include color information from an input image and extracts a candidate area having color information in operation S1010.

As an example, operation S1010 includes an operation of classifying the input image into a plurality of areas, an operation of sampling pixel data with respect to each classified area, an operation of eliminating the area that does not include color information by using the sampled pixel data, and an operation of obtaining an average value of sampled pixel data with respect to the candidate area.

The automatic white balance adjusting apparatus determines a grey area from the candidate area, and extracts the grey area as an effective area based on a correlation between a color temperature and the grey area.

As an example, operation S1020 may include an operation of determining the grey area based on a relationship between Cr and Cb with respect to the candidate area and a relationship between R and B with respect to the candidate area, an operation of classifying the grey area by using color temperature information, luminance information, and a correlation relationship with respect to the grey area, and an operation of selecting the effective area based on a correlation between a grey area model and an area classified as an area having more luminance information than a reference value among the grey area.

In this instance, the determining of the grey area may include an operation of transforming a color coordinate with respect to the candidate area into Cr and Cb color coordinates, an operation of determining a candidate grey area from the candidate area of which color coordinate is transformed into the Cr and Cb color coordinates, an operation of filtering the grey area by using a ratio of R and B with respect to the candidate grey area.

The classifying of the grey area may include an operation determining a magnitude of luminance information and color temperature information with respect to the grey area, an operation of classifying the grey area based on the magnitude of the luminance information and the color information, an operation of counting R, G, and B values with respect to the grey area, and a number of grey areas, and an operation of calculating a correlation between the classified grey area and a grey area model. Then, the selecting of the effective area may select a grey area of which a correlation between the classified grey area and the grey area model is more than a reference value, as the effective area.

In operation S1030, the automatic white balance adjusting apparatus determines the white balance parameter from the effective area and determines a white balance with respect to the input image.

As an example, operation S1030 may include an operation of calculating the white balance parameter from area data of the effective area, and an operation of correcting the input image by applying the white balance parameter to the input image.

As an example, operation S1030 may apply the R, G, and B values with respect to the grey area selected as the effective area and the number of counted grey areas as the white balance parameter and may adjust the white balance with respect to the input image.

According to an example embodiment, an area having a pixel that does not include color information is eliminated before selecting the grey area, and thus, a light source predictive error may be prevented when a highlight image exists in the image.

According to an example embodiment, a grey area is extracted based on a relationship between R and B of the grey area, in addition to a relationship between Cr and Cb of the grey area, and thus, a white balance with respect to the grey area may be more accurately adjusted.

According to an example embodiment, a grey pixel that is affected by a real light source is selected, as an effective area, by using a correlation between a color temperature and an extracted grey pixel, and thus, a white balance is more accurately adjusted.

The automatic white balance adjusting method according to the above-described example embodiments may also be implemented through computer readable code/instructions in/on a medium, e.g., a computer readable medium, to control at least one processing element to implement any above described example embodiment. The medium can correspond to any medium/media permitting the storing and/or transmission of the computer readable code. A processing element could include a processor or a computer processor, and processing elements may be distributed and/or included in a single device.

The computer readable code can be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although a few example embodiments have been shown and described, it would be appreciated by those skilled in the art that changes may be made in these example embodiments without departing from the principles and spirit of the invention, the scope of which is defined in the claims and their equivalents.

What is claimed is:

1. An apparatus of adjusting an automatic white balance, the apparatus comprising:
    a candidate area extracting unit to extract, from an input image, a candidate area having color information by eliminating an area that does not include color information;
    an effective area extracting unit to determine a grey area from the candidate area based on a relationship between Cr and Cb with respect to the candidate area and a relationship between R and B with respect to the candidate area, and to extract an effective area from the grey area based on a correlation between a color temperature and the grey area; and
    a white balance adjusting unit to determine a white balance parameter from the effective area and to adjust a white balance with respect to the input image.

2. The apparatus of claim 1, wherein the candidate area extracting unit comprises:
    an area classifying unit to classify the input image into a plurality of areas;
    a data sampling unit to perform sampling of pixel data with respect to each classified area;
    an area eliminating unit to eliminate the area that does not include the color information by using the sampled pixel data; and
    a data operation unit to perform an operation to obtain an average value of the sampled pixel data with respect to the candidate area.

3. The apparatus of claim 1, wherein the effective area extracting unit comprises:
    a grey area determining unit to determine the grey area;
    a grey area classifying unit to classify the grey area by using color temperature information, luminance information, and the correlation with respect to the grey area; and
    an effective area selecting unit to select the effective area based on a correlation between a grey area model and an area classified as an area having luminance information of a higher value than a reference value within the grey area.

4. The apparatus of claim 3, wherein the grey area determining unit comprises:
    a color coordinate transforming unit to transform a color coordinate with respect to the candidate area;
    a candidate grey area determining unit to determine a candidate grey area based on the relationship between Cb and Cr with respect to the candidate area having the transformed color coordinate; and
    a grey area filtering unit to perform filtering of the grey area by using a ratio of R and B with respect to the candidate grey area.

5. The apparatus of claim 3, wherein the grey area classifying unit comprises:

a magnitude determining unit to determine a magnitude of the luminance information and a magnitude of the color temperature information with respect to the grey area;

an area classifying unit to classify the grey area according to the magnitude of the luminance information and the magnitude of the color temperature information;

a counting unit to count R, G, and B values with respect to the classified grey areas, and to count a number of the classified grey areas; and a correlation operation unit to perform an operation to obtain the correlation between the color temperature and the grey area, wherein the effective area selecting unit selects a grey area of which a correlation between the color temperature and the classified grey area is more than the reference value, as the effective area, and the white balance adjusting unit adjusts the white balance of the input image by using the white balance parameter which is based on the R, G, and B values with respect to the grey area selected as the effective area, and the number of counted grey areas.

6. A method of adjusting an automatic white balance, the method comprising:

extracting, from an input image, a candidate area having color information by eliminating an area that does not include color information;

determining a grey area from the candidate area based on a relationship between Cr and Cb with respect to the candidate area, and a relationship between R and B with respect to the candidate area, and extracting an effective area from the grey area based on a correlation between a color temperature and the grey area; and determining a white balance parameter from the effective area and adjusting a white balance with respect to the input image.

7. The method of claim 6, wherein the extracting of the candidate area comprises:

classifying the input image into a plurality of areas;
sampling pixel data with respect to each classified area;
eliminating the area that does not include the color information by using the sampled pixel data; and
performing an operation to obtain an average value of the sampled pixel data with respect to the candidate area.

8. The method of claim 6, wherein the extracting of the effective area comprises:

determining the grey area;

classifying the grey area by using color temperature information, luminance information, and the correlation with respect to the grey area; and selecting the effective area based on a correlation between a grey area model and an area classified as an area having luminance information of a higher value than a reference value within the grey areas.

9. The method of claim 6, wherein the determining of the grey area comprises:

transforming a color coordinate with respect to the candidate area;

determining a candidate grey area based on the relationship between Cb and Cr with respect to the candidate area having the transformed color coordinate; and filtering the grey area by using a ratio of R and B with respect to the candidate grey area.

10. The method of claim 8, wherein the classifying of the grey area comprises:

determining a magnitude of the luminance information and a magnitude of the color information with respect to the grey area;

classifying the grey area according to the magnitude of the luminance information and the magnitude of the color temperature information;

counting R, G, and B values with respect to the classified grey area, and counting a number of the classified grey areas; and performing an operation to obtain the correlation between the classified grey areas and the grey area model, wherein the selecting of the effective area selects a grey area of which a correlation between the color temperature and the classified grey area is more than the reference value, as the effective area, and the adjusting of the white balance adjusts the white balance of the input image by using the white balance parameter which is based on the R, G, and B values with respect to the grey area selected as the effective area, and the number of counted grey areas.

11. A non-transitory computer readable recording medium storing a program causing at least one processing element to implement the method of claim 6.

* * * * *